United States Patent
Davoust et al.

(10) Patent No.: US 7,650,069 B1
(45) Date of Patent: Jan. 19, 2010

(54) GRANNYSNAP ARCHITECTURE

(75) Inventors: Paul Davoust, Louisville, CO (US);
Paul Hudnut, Fort Collins, CO (US);
David Taenzer, Aurora, CO (US);
Michael D. Williams, Boulder, CO (US)

(73) Assignee: CaringFamily, LLC, Boulder, CO (US)

( * ) Notice: Subject to any disclaimer, the term of this patent is extended or adjusted under 35 U.S.C. 154(b) by 235 days.

(21) Appl. No.: 11/381,974

(22) Filed: May 5, 2006

Related U.S. Application Data

(60) Provisional application No. 60/678,349, filed on May 6, 2005.

(51) Int. Cl.
G03B 17/48 (2006.01)
H04N 5/225 (2006.01)
(52) U.S. Cl. .................................. 396/429; 348/207.1
(58) Field of Classification Search ................. 396/429; 348/14.01, 14.02, 207.1, 207.2, 207.99
See application file for complete search history.

(56) References Cited

U.S. PATENT DOCUMENTS 7,014,374 B2 * 3/2006 Hamaguchi et al. ........... 400/62
2003/0103144 A1 * 6/2003 Sesek et al. ............... 348/207.1
2004/0171371 A1 * 9/2004 Paul ........................ 455/414.4
2005/0256943 A1 * 11/2005 Morris ........................ 709/220
2006/0189349 A1 * 8/2006 Montulli et al. ........... 455/556.1
2006/0215035 A1 * 9/2006 Kulas ..................... 348/207.99
2006/0279628 A1 * 12/2006 Fleming ....................... 348/143

* cited by examiner

*Primary Examiner*—Rodney E Fuller
(74) *Attorney, Agent, or Firm*—Hamilton, DeSanctis & Cha LLP

(57) ABSTRACT

Systems and methods for facilitating photo completion are provided. According to one embodiment, a system is provided including a hand held device, an application running on the hand held device, and a printing system. The hand held device includes the capability to both capture and transmit digital photos. The application provides the hand held device with hyper-simplified photo capture and delivery. In one embodiment, the application defaults a number of parameters that can be configured on the hand held device, such as the target, the photo review mechanism, the presentation method. These defaults can be set (reset) directly in the application or overridden in the system post transmission processing. In one embodiment, the printing system may control the schedule of publication. For example, the printing system may print received digital photos immediately, the next morning, on a periodic basis, or after receiving eMail confirmation.

18 Claims, 9 Drawing Sheets

GRANNYSNAP ARCHITECTURE

CROSS-REFERENCE TO RELATED APPLICATIONS

This application claims the benefit of U.S. Provisional Application No. 60/678,349, filed on May 6, 2005, which is hereby incorporated by reference for all purposes. This application is related to the subject matter of co-pending U.S. patent application Ser. Nos. 10/971,916 and 10/972,000 both filed on Oct. 23, 2004 and both of which are hereby incorporated by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2005-2006, CaringFamily, LLC

BACKGROUND

1. Field

Embodiments of the present invention generally relate to purpose driven computing and lifestyle-adapted communications solutions, and in particular, to photo completion.

2. Description of the Related Art

Families are frequently located far away from one another, including their aging loved ones. Technology, including personal computers and the Internet, are natural mechanism used by younger members of the family to stay in touch. However, the older a person is, the less likely they are able or interested in owning and using a personal computer, the Internet or email.

The mismatch in the rate of technology adoption between younger and older cohorts of the population makes it increasingly difficult for families to cultivate and sustain the level of communication with their elders that is required to help the elders avoid loneliness and isolation.

Existing mechanisms for connecting non-computer users into the electronic life of their friends and families, such as MSN® TV (formerly WebTV) and EarthLink MailStation™, are plagued with problems that lead to non-acquisition, abandonment or ineffective use of the system chosen. Consequently, alternatives to complicated personal computers and pseudo computers for elders and similarly situated people are needed to provide them with means of communicating via email.

Similarly, camera phones and digital cameras are approaching ubiquity with all demographics except the elderly. Transmission, downloading and printing digital photos taken with these and other hand held devices is complicated and requires several post-photo steps and typically pre-photo configuration steps, as well. As a result, many digital photos remain in digital form on flash memory sticks and are not widely shared with friends and family.

SUMMARY

Systems and methods are described for facilitating photo completion. According to one embodiment, a system is provided including a hand held device, an application running on the hand held device, and a printing system. The hand held device includes the capability to both capture and transmit digital photos. The application provides the hand held device with hyper-simplified (e.g., "one button") photo capture and delivery and immediately returns the camera to a state in which it can perform another photo taking/transmission event. In one embodiment, the application defaults a number of parameters that can be configured on the hand held device, such as the target (e.g., eMail address), the photo review mechanism (e.g., Direct, Hold for review, Review before send), the presentation method (e.g., collage, . . . ). These defaults can be set (reset) directly in the application or overridden in the system post transmission processing.

In one embodiment, the printing system may control the schedule of publication. For example, the printing system may print received digital photos immediately, the next morning, on a periodic basis, or after receiving eMail confirmation. The printing system may also optionally set reminders (e.g., send eMail to offer additional personalization before delivery) and set defaults for printing of various information (e.g., sender, time stamp, location stamp {think GPS with location naming service—e.g. the Zoo}, pre-packaged message, . . . etc.).

According to one embodiment a publication switch a system and method is provided for controlling the instructions for unattended printing of eMails. Various processing methods may be applied to an eMail header (including the To: address portion, and/or the title) that direct eMail processing to a configurable parsing mechanism that establishes specific modifications for printing the eMail at a digital mailbox. Further, the configuration may be modifiable by the sender as managed through their caregroup website for the specific printing device (i.e. mailbox) being targeted. Distinct instructions may then be associated with distinct eMail addresses or arguments sent in the eMail address or in the message header.

According to one embodiment, a joint payment method which facilitates multiple caregroup members to manage the automated payment of a continuing service by (i) gaining commitment of a primary buyer, and (ii) optionally gaining additional member payer commitments to cover a portion of the typically monthly service fees that is then deducted from the primary buyer commitment.

According to one embodiment, a method is provided for mechanically assuring the orientation of paper to a printing or scanning device. Custom paper is provided with notching matched to a simple physical paper loading constraint that naturally forces the orientation of sheets of paper to a specific side and orientation. The matching physical notch constraint can be used on input tray(s) and/or scanning flatbeds.

According to one embodiment, a method of monitoring, logging and reporting the presence of paper in the printer output tray is provided. In one embodiment, a process running remotely within a family private network service monitors the activity level of an elder end user of a digital mailbox appliance. For example, if the elder doesn't respond by picking up digital mailbox appliance hard copy output, an alert may be generated to check the elder for the onset of depression or some other condition. In some embodiments, the family private network service may track even a delay in pickup. For example, if the elder has a consistent habit of picking up inputs within an hour after they arrive, a multi-hour delay may be indicative of a potential problem.

According to one embodiment, a method is provided that assures the convenient asynchronous processing and delivery of images to a remote, client-based software application. The software application (i) accepts image references (e.g., local files of the appropriate file type, URL's to remote files of the appropriate type), which can be delivered to the application in a number of manners (e.g., drag and drop to the application shortcut, to the application user interface, typed references, . . . ), and (ii) manages the communications with a remote service (e.g., a family private network service) to upload the images in the background (i.e., asynchronously with other user client applications). In one embodiment, the method may be elaborated to manage typical errors in the bulk transmission of images to a remote application (e.g., warning of image files previously uploaded (or in process), rejection and notification of image files exceeding certain known limits—size, . . . etc.).

In one embodiment, a content derived addressing barcode may be used as a command to assign and/or reassign a digital mailbox appliance to a specific caregroup. In one embodiment, the content derived addressing barcode may be used as part of a method to facilitate installation, reconfiguration and/or relocation of a digital mailbox appliance. In one embodiment, a "scan me first" page is use to set (reset) the owner of a digital mailbox appliance. Using such an install scan page, allows a random digital mailbox appliance to be associated with an arbitrary caregroup by simply sending a scan of a piece of paper independently delivered to the installer. Thus, a digital mailbox appliance can be associated with a room and if a new resident arrives a simple scan resets the mailbox to their usage.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
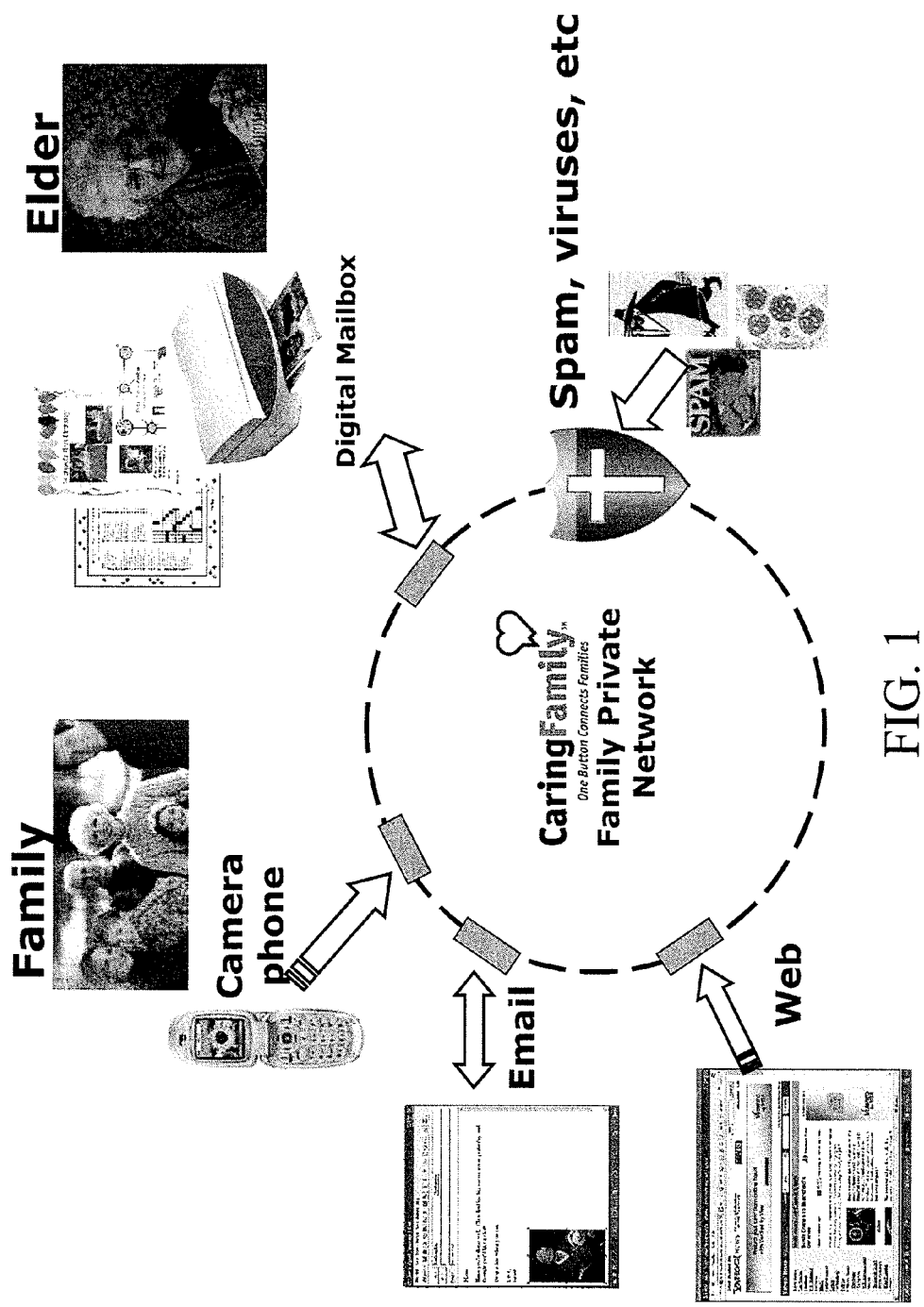
FIG. 1 conceptually illustrates a family private network service of a communication service provider with which various embodiments of the present invention may operate.

Methods and systems are described to facilitate photo completion. According to one embodiment, the "distance" from impulse photo to hard copy output of such photo is shortened by hyper simplifying the taking, transmitting and printing photos of value thereby allowing these photos to be more broadly shared with family and friends.

According to one embodiment, a digital mailbox system is provided to facilitate receipt and transmission of electronic communications without requiring the end user to have a personal computer. According to one embodiment, a digital mailbox system facilitates receipt and transmission of electronic communications without requiring the end user to have a personal computer. The digital mailbox system includes a novel architecture through which the various interacting parties may use an electronic communication access system that suits their particular needs and technological comfort level thereby adding grace back to the lives of both the elder and their social support network. The novel architecture may provide various tools and applications to promote communications among members of a social support network. For example, according to one embodiment, collaborative and/or individual publishing tools are provided via a website interface to enable collaborative and/or individual development of a daily delivery of a digital publication, such as a newsletter-like publication or the like, for communication to elders by friends, caregivers, family and volunteers. In one embodiment, members of a social support network may select and/or customize content for inclusion in the digital publication from various predefined data streams (e.g., jokes, business news, global news, local news, sports news, puzzles, cartoons, weather, etc.) based upon interests, hobbies and/or cognitive needs (e.g., intellectual stimulation) of the intended recipient. For example, the kinds of material typical of newspaper syndicated features can be provided, such as horoscope, literary quote of the day, "on this day in history", "in your garden today", and the like, selected by the members of the elder's social support network to be appropriate to the elder's interests. In one embodiment, members of a social support network may create or harvest existing family content, such as digitized photos, daily deliveries, digitized art created by children (a/k/a "kid art"), and use it to create various compositions to share among one another and/or the digital mailbox appliance user.

Meanwhile, an elder may make use of a dedicated hard-copy device for sending and receiving electronic communications without the need for a computer, keyboard or mouse. In this manner, the novel architecture acts as a communications transformer by receiving electronic communications in one form from the originator of the communication and outputting the electronic communication in a form suitable for access by an intended recipient thereby facilitating communication to and from those disinclined or unable to use computers, the internet, and/or home networks.

In one embodiment, an application, at times referred to herein as "GrannySnap," is provided for hand held devices, such as camera phones, that simplifies the taking, transmitting and printing of photos. The overhead associated with sending an event photo to a friend or family member, such as grandma, is reduced by automating certain functions and managing control of the hand held device through a variety of configuration options that can be 1) performed asynchronously to the impulse to send and 2) can be completely ignored in the simplest default configuration.

According to one embodiment, the GrannySnap application provides hyper-simple, e.g., one button picture taking and simplified configuration to target (i.e., who or where), to permit review, and to set presentation.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, customer service personnel associated with a communication service provider, caregroup members serving in a customer service role and/or firmware.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While according to one embodiment, a digital mailbox system is described as a communication mechanism among families and elders, other embodiments of the digital mailbox system are equally applicable to facilitating electronic communications to and from other groups of individuals, such as developmentally disabled adults. Furthermore, the communications may include unrelated individuals within a common social support network.

While, for convenience, embodiments of the present invention are described with reference to an Application Service Provider (ASP) model, embodiments of the present invention are equally applicable to various other operational models. For example, the systems and methods described herein may be deployed in accordance with a model in which the application is hosted internally by a organization and made accessible to various distributed locations of the organization.

Finally, while for sake of illustration, embodiments of the present invention are described with reference to camera phones, embodiments of the present invention are equally applicable to various other hand held or mobile devices that are capable of capturing and transmitting digital photos, such as a digital camera with wireless transmission capability.

Terminology

Brief definitions of terms used throughout this application and attached appendix are given below.

The phrase "administrating caregiver" generally refers to a member of a caregroup that has certain administrative privileges within the communication system platform. In one embodiment, administrating caregivers have access and permissions to operate a communications service dashboard. Administrating caregivers may have the ability to add or remove members to the caregroup, update family data, manage member viewing, editing and notification permissions, originate coaching prompts, configure many of the VPN and digital mailbox appliance behaviors like time of elder's daily delivery, default printing font, etc. Caregroups may have one or more administrating caregivers.

The terms "caregroup" and "members" and the phrases "social support network" and "family support network" generally refer to a collection of individuals, including family, friends, caregivers, volunteers and/or service providers, who are registered members of a VPN associated with a user of communication appliance, such as a digital mailbox appliance. An individual may be a member of multiple caregroups. Members may have different viewing, editing and notification permissions independently associated with each caregroup in which they participate. For example, administrative caregiver permissions described above are one such set of permissions.

The term "carousel" generally refers to a software implemented content buffering mechanism that may receive and store content at one rate and output the stored content at another rate. In one embodiment, one or more carousels are provided by a communication service provider that allow members of a family support network to collect material, such as family photos, items of information, articles, personalized messages, jokes, etc., that will be incorporated over time in a periodic digital publication delivered to an elder. In this manner, a family member can automatically direct selected data feed content to a carousel or manually place original and/or personalized content into a carousel, whenever he or she has time to do so. Then, content from the carousel may be included in various periodic digital publications intended for the elder, such as a daily delivery, when space permits and as needed to provide content in such periodic digital publications. The buffering provided by use of one or more carousels, e.g., photo carousels or personalized content carousels, may be used to smooth the resulting communication over variations in how much time the members of the family support network have to devote to communication or contribution of content or photos. Like photos, items of information from data feeds may also be collected in carousels for use over time. A predetermined or customizable delay may be established before buffered carousel content can be used in the periodic digital publication. This allows members of the family support network to examine, filter, edit, personalize and/or delete unwanted items before they are delivered to the elder. A brief, personal note on a cartoon or joke can add to its affective impact by pointing out a special meaning of the item for the elder or the family.

The phrase "coaching message" generally refers to a message intended to directly or indirectly encourage activity. According to one embodiment coaching messages are messages originated internal to a caregroup VPN either from the communication service provider or a caregroup member or the user of a communication appliance associated with the caregroup VPN that encourages or "prompts" the generation of a new message within the caregroup. For example, a coaching message may directly or indirectly encourage communication with the user(s) of a digital mailbox appliance or encourage the use of new or under used content types available within the communication system platform. Coaching messages may be originated by staff members and/or administrators of the communication service provider, administrating caregivers, or even the user (e.g., an elder) of a digital mailbox appliance. According to one embodiment, various coaching editors are provided within the communication system platform to assist administrating caregiver(s) with the task of creating and sending coaching messages.

In one embodiment, the communication system provider may detect a behavior (or an individual user or a family) and generate a coaching message to one or more family members in response to what is detected. For example, a coaching message may simply encourage a family member to check in by logging onto the family VPN. Certain automatically generated coaching messages may also encourage use of new or under used content types, boost personalization or even add to the members personal data to enhance the overall experience. Other types of coaching messages may supply intellectual stimulation to the elder, recognize family "days of note," encourage an increase in the affective content of correspondence directed to the elder, encourage wider group participation, require specific responses from the elder, and the like.

The terms "connected" or "coupled" and related terms are used in an operational sense and are not necessarily limited to a direct connection or coupling.

The phrase "content derived addressing" generally refers to a process that permits a user of a communication appliance, such as a hardcopy-based email appliance, to send a message to one or more caregroup members without having to specify an email address, phone number or the like. Rather, the message itself contains sufficient information to allow a communication service provider to determine the intended addressee(s). According to one embodiment, with a single press of a button on a hardcopy-based communication appliance an elder may have a message delivered electronically to any caregroup member as part of an email message.

The phrase "digital gift" generally refers to an electronically delivered communication sent by a participant in a social support network or by the individual(s) that are the focus of the social support network. Examples of digital gifts include collages of digital photos, simple text messages, email messages, photo essays, eCards, ready made communications, FamilyWeather, customized/customizable Health and Wellness tips, KidArt and personalized ready made communications. According to one embodiment, certain ready made digital gifts for delivery to (or from) an elder can be personalized within a few seconds to a few minutes and electronically delivered message (to or from an elder). Digital gifts may be responses to queries, created in digital gift editors, parsed out of standard email formats, or derived from paper forms supplied to the user of a hardcopy communication appliance. Digital gifts often have attractive and emotive decoration and layout. Digital gifts may also contain customized health and wellness status indicators (including, but not limited to mood, sleep, eating, measurements of body fluids or status). According to one embodiment, the printed form of digital gifts that are deliverable to a digital mailbox appliance may be adapted for an elder's personal requirements (e.g., large fonts, high contrast presentation, even adaptation for color blindness).

The phrase "digital mailbox appliance" generally refers to a communication appliance or component configured to be associated with a caregroup VPN through a closed communication service. In one embodiment, a digital mailbox appliance is a hardcopy-based communication appliance that (i) accepts hardcopy input, e.g., paper-based messages, and creates a digital representation of the hardcopy input for electronic delivery, e.g., email delivery of such digital representation or digital gifts based on such digital representation, to one or more members of the caregroup associated with the digital mailbox appliance; and (ii) creates hardcopy output, e.g., paper-based messages, responsive to electronic delivery of communications from caregroup members that are directed to the user of the digital mailbox appliance. According to one embodiment, digital mailbox appliances are remotely maintained by a communication service provider responsive to calls to the communication service provider initiated by the digital mailbox appliances. Depending upon the particular embodiment, a digital mailbox appliance is both simpler than a multifunction printer (MFP) and more functional than an MFP. According to one embodiment, a digital mailbox appliance is simpler than an MFP in that it excludes many MFP features, such as a copier, a universal serial bus (USB) connection to and operation with a PC (or network of PC's), local control of quality (print and scan). According to one embodiment, a digital mailbox appliance is more functional than a MFP in that it connects to and depends on a closed communication service, in that it schedules daily printing, in that it connects to the closed communication service at a time of it's choosing (modem management based on local configuration). It is envisioned that a digital mailbox appliance may be embedded within other consumer devices, such as printers, fax machines, or the like. Also, in embodiments in which hardcopy output is not desired or needed, the digital mailbox appliance may comprise or be part of a cell phone, a personal digital assistant (PDA), or other current or future handheld wireless devices.

The phrase "Drop Box" generally refers to a client side application that asynchronously delivers images to a Caregroup's shoebox for later publication as a part of one or more digital gifts which may be delivered to an elder.

The term "eCard" generally refers to an generally refers to an electronically delivered communication in the form of a card, such as a greeting card.

The phrase "eMail Button" generally refers to a client side add-on to be embedded into a member's email client to encourage sending messages to an elder.

The term "elder" generally refers to an aging family member, such as a parent or grand parent. Typically, the elder is the user of a digital mailbox appliance and a center of focus of a social support network, such as a caregroup, and a target recipient of communication services. An elder might also might be an isolated or disabled family member.

The phrase "ex-officio member" generally refers to a member of a caregroup that has been granted access because of some commercial or support group relationship to the caregroup. Without limitation, examples include the entity or organization that provides the communication service, church groups (e.g., the elder's shut-in committee of their church), an "attending" home care agency, supporting personnel in an assisted living situation, physician, nurse, physician's assistant, insurance provider . . . etc. Ex-officio members typically have access to specialized customer support tools (though a communication service provider customer services website). The tools available and access to information within them may be configured for each caregroup-ex-officio role.

The term "GrannySnap" generally refers to an application loaded into a member's CameraPhone that sends photos directed to a digital gift to be presented with an elder's next delivery. As a result, in accordance with various embodiments of the present invention, the CameraPhone is one click away from printing a family photo at the elder's residence thereby increasing photo completion rates.

The phrase "helper member" generally refers to a volunteer or commercial caregiver with member status within a caregroup permitted by the administrating caregiver. Examples of helper members include members of a church group, employees of a home care agency, a geriatric consultant, or members of a specialized supporting group (e.g., for Alzheimer's care).

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

The phrase "Joint Payment" generally refers to a mechanism that permits multiple Caregroup members to share the cost of a service subscription. According to one embodiment of the present invention, the shared service subscription may be managed by each joint payer independently.

If the specification states a component or feature "may", "can", "could", or "might" be included or have a characteristic, that particular component or feature is not required to be included or have the characteristic.

The term "Notch" generally refers to a cut, indentation, nick, score or the like. According to one embodiment, sheets of paper used with the digital mailbox appliance may be notched to match physical restraints of a scanner and/or a printer associated with the digital mailbox appliance to fix the orientation of sheets of paper for proper scanning and printing. In one embodiment, the lower right or left corner of sheets of paper or forms intended for use in connection with a digital mailbox appliance are cut off and matching "physical constraints" are provided on the input tray and the scan bed to force the end user (e.g., an elder) to place the paper or form in a known orientation.

The phrase "photo essay" generally refers to a story accompanied by one or more photos. Photo essays are typically about an event or adventure and typically include a paragraph or two about each photo and may include several pages of annotated photos. Examples of photo essays include, without limitation, a story about a trip to Belize by the great granddaughter, stories about diving trips, a photo home tour of a recently purchased condo, pet essays, a retirement party, a classroom party, a Tahiti cruise in planning, participation in a major running race, several local parades, kids climbing a rock wall, and fishing trips. According to one embodiment of the present invention, a photo essay digital gift editor is provided that makes it easy to format and create this kind of content.

The phrase "presentation components" generally refer to editable elements of a digital gift in a digital gift editor.

The term "project" generally refers to multi-day and/or multi-person communication activities, such as the joint creation of an archive of family recipes, an annotated collection of old family photos, a turn taking game (e.g. scrabble, chess, checkers, . . . ) etc.

The phrase "Publication Switch" generally refers to a method supporting customized delivery of information into a variety of publications. According to various embodiments of the present invention, the variety of publications may be scheduled for an elder's next delivery.

The term "responsive" includes completely or partially responsive.

The term "scan," when used as a noun, generally refers to a digital representation of a page of correspondence originated at a digital mailbox appliance.

The term "WebSnap" generally refers to a client side application loaded into a member's Internet browser that prepares and send a web page directed to a digital gift. According to one embodiment, the digital gift may be presented with an elder's next delivery.

Social isolation and loneliness are problems for many elders, and such conditions are strongly associated with health problems and reduced feelings of well-being. To address this problem, the methods and systems described herein seek to promote what Liechti and Ichikawa (1999) call affective awareness: "a general sense of being in touch with one's family and friends." According to various embodiments of the present invention, communications from a social support network to the individual(s) that are the focus of the social support network are designed to carry not only an informational message but also, more importantly, a message of engagement and caring.

Studies of family communication have shown that the actual content or information exchanged during or in a communication is not the most important aspect of a communication. Rather, it is the expression of interest in the relationship that is of importance as a result of the initiation of a call or sending of a card or email message. Patrick and Metcalf {Patrick, E. and Metcalf, C. (nd) Mediated communication between extended family and friends: A case study. Motorola Labs User Research Report at http://internet2.motlabs.com/user/vmc-study/.} have indicated, "The most striking implication . . . is that communication for shared experience, so important in maintaining distance relationships, is not adequately supported by the communication media available today." Embodiments of the present invention also attempt to address this need.

Meanwhile, not only elders but also family caregivers need support that increased and better communication can provide. Biegel and Schultz (1999), in their introduction to a special issue of Family Relations devoted to family caregivers, note both the prevalence of family caregiving and the burdens it creates. These can include lack of support and assistance from other family members. Picot and Lowell (2001) estimate that there are more than 25 million family caregivers in the United States, and that many feel a significant burden. In the extreme, family caregivers can suffer caregiver burnout (Lee et al. 2001).

Embodiments of the present invention provide methods and systems for creating a virtual private network (VPN) connecting non-computer users with their social support networks who do use computers, camera phones, and/or email appliances. In one embodiment, coaching techniques are employed to influence the quantity, quality, effectiveness and timeliness of electronic communications to and from individuals frequently isolated from family and friends.

Information technology methods and systems are described herein that seek to empower participants in a social support network by simplifying the task of creating and initiating communications. In the context of various embodiments described herein the methods and systems seek to allow family members to provide more effective support to an elder living independently. For example, various communications tools make it easier for family caregivers to provide stimulating and useful information to the elder, helping to sustain health, activity and engagement. Embodiments of the present invention operate as a communication transformer making it possible for family members to communicate with elders using the Internet, without requiring the elders to operate or maintain a computer. It is contemplated that the methods and systems described herein will make it easier for family caregivers to share information and ideas among themselves, and increase the general level of communication within the family generally as well as to and from the elder.

In one embodiment, a proprietary device or set of devices referred to as a "digital mailbox" or a "digital mailbox appliance" allows electronic communication with elders. The digital mailbox provides a much simpler user interface for the elder than email or other existing computer applications. The digital mailbox may incorporate features of a fax machine, a photo printer, and a scanner, backed by servers operated by a communication service provider. A member of a social support network is able to generate email or create a digital gift or contribute to a periodic publication which is delivered to the elder as a high-quality hardcopy with no intervention required by the elder via the communication service provider. According to one embodiment, the elder can send correspondence to a member of his/her social support network from his/her digital mailbox by simply placing it on a flat scanner bed and pressing a single button. No typing or dialing is required. As described further below with respect to content derived addressing, addressing the correspondence may accomplished by checking off address information on a routing form provided by the communication service provider and customized for the elder. In another case described below the addressing the correspondence is automatic because the form being used is an explicit reply to a prior communication. Thus, elders can receive and send electronic messages, including images, with no use of a computer and with an extremely simple interface.

According to one embodiment of the present invention, a communication system in which the digital mailbox operates provides an online interface, such as a password protected portion of a web portal, into which participants in a social support group my login. The communication system may include various automated communication tools that allow family members or others in an elder's social support network to send engaging, interesting and useful information to the elder. In view of empirical evidence suggesting elders specifically value predictable communication, versus just getting emails every now and then, embodiments of the present invention facilitate the delivery of information to the elder on a predictable schedule, even when the schedules of the participants in the social support network do not permit such regular communications. The communication system may also provide tools that help family members support one another in their various caregiver roles.

According to one embodiment of the present invention, the digital mailbox appliance provides an unattended printing feature. This unattended printing aspect of the digital mailbox appliance has significant impact. In one embodiment, to receive messages and digital gifts the elder does not have to turn anything on, to login, to use a keyboard, or mouse, or even a TV-like remote control. Gifts and messages simply appear at a regular time of day much as does the mail delivered by the US Post Office.

The communication system may also gather information about the communications exchanged within participating social support networks to allow assessment of the impact of the communications on elders. Impact metrics may then be viewed and analyzed in graphical form by a social support network administrator, such as a family representative or other administrating caregiver. Exemplary impact metrics may include simple counts, assessed value or other measures of effects, communications and gift categories by member, by type, and/or during a specified time period. Effect monitoring may include calculating an assessed value of affective communications, communications that induce intellectual stimulus and/or communications that induce activity. Communication monitoring may include a simple count of digital gifts originated by participants in a social support network and/or the individual(s) that are the focus of the social support network. Digital gift monitoring and analysis may include categorization of digital gifts and tracking of the number of digital gifts in the categories (e.g., collages, simple text messages, email messages, photo essays, ready made communications, and personalized ready made communications).

FIG. 1 conceptually illustrates a family private network service of a communication service provider with which various embodiments of the present invention may operate. Advantageously, according to the embodiment depicted, each participating family member can interface with the family private network via electronic services gateways with which they are familiar. For example, an elder may receive email, web pages, pictures from camera phones, etc. by way of hard copy output from a digital mailbox. Meanwhile, other family members may provide content, in the form of digital pictures, for example, to the family private network by way of a hand held device, such as a camera phone.

Figure 2:
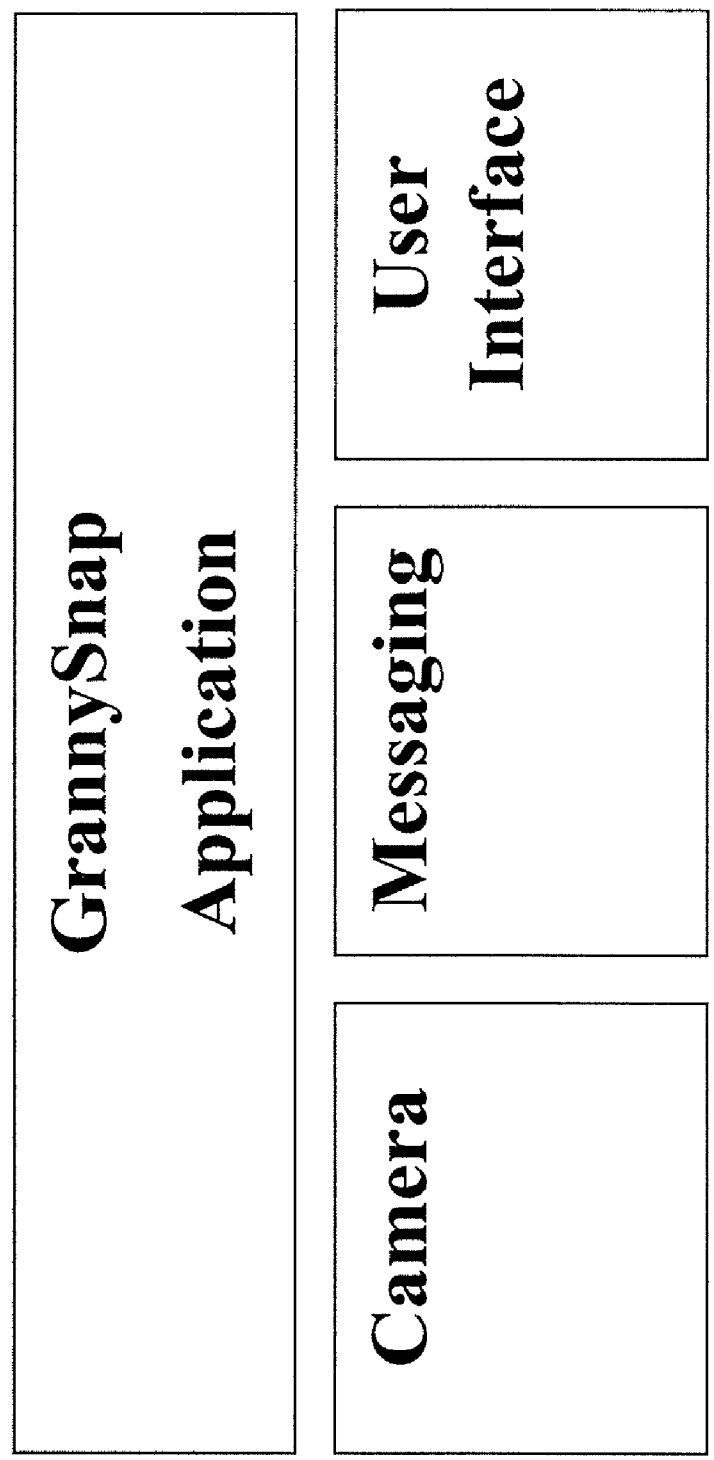
FIG. 2 is a simplified block diagram of the GrannySnap architecture according to one embodiment of the present invention.

FIG. 2 is a simplified block diagram of the GrannySnap architecture according to one embodiment of the present invention. According to one embodiment, GrannySnap is an application that operates various functions of a hand held device through the hand held device's standard application programming interfaces (APIs). For example, the GrannySnap application may interact with user interface functions, a camera, a text messaging system, electronic mail, and/or other transmission components, e.g., wireless or Bluetooth, of a hand held device, such as a mobile phone, personal digital assistant, BlackBerry or the like.

Figure 3:
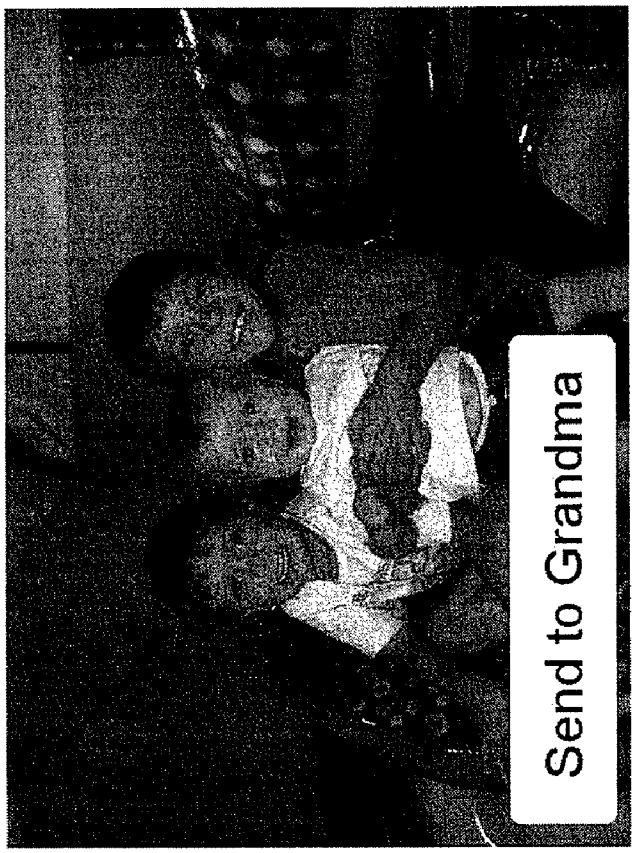
FIG. 3 illustrates a GrannySnap screen after a photo is taken with the confirmation configuration set according to one embodiment of the present invention.

FIG. 3 illustrates a GrannySnap screen after a photo is taken with the confirmation configuration set according to one embodiment of the present invention. In this sample GrannySnap screen, after a photo is taken, the user is provided with a single-click mechanism of confirming whether the photo should be sent to a predetermined recipient (e.g., grandma). In alternative embodiments, the GrannySnap application may be configured to simply send photos as soon as possible and simply informing the hand held device user that it is being sent and/or confirming upon successful delivery.

Figure 4:
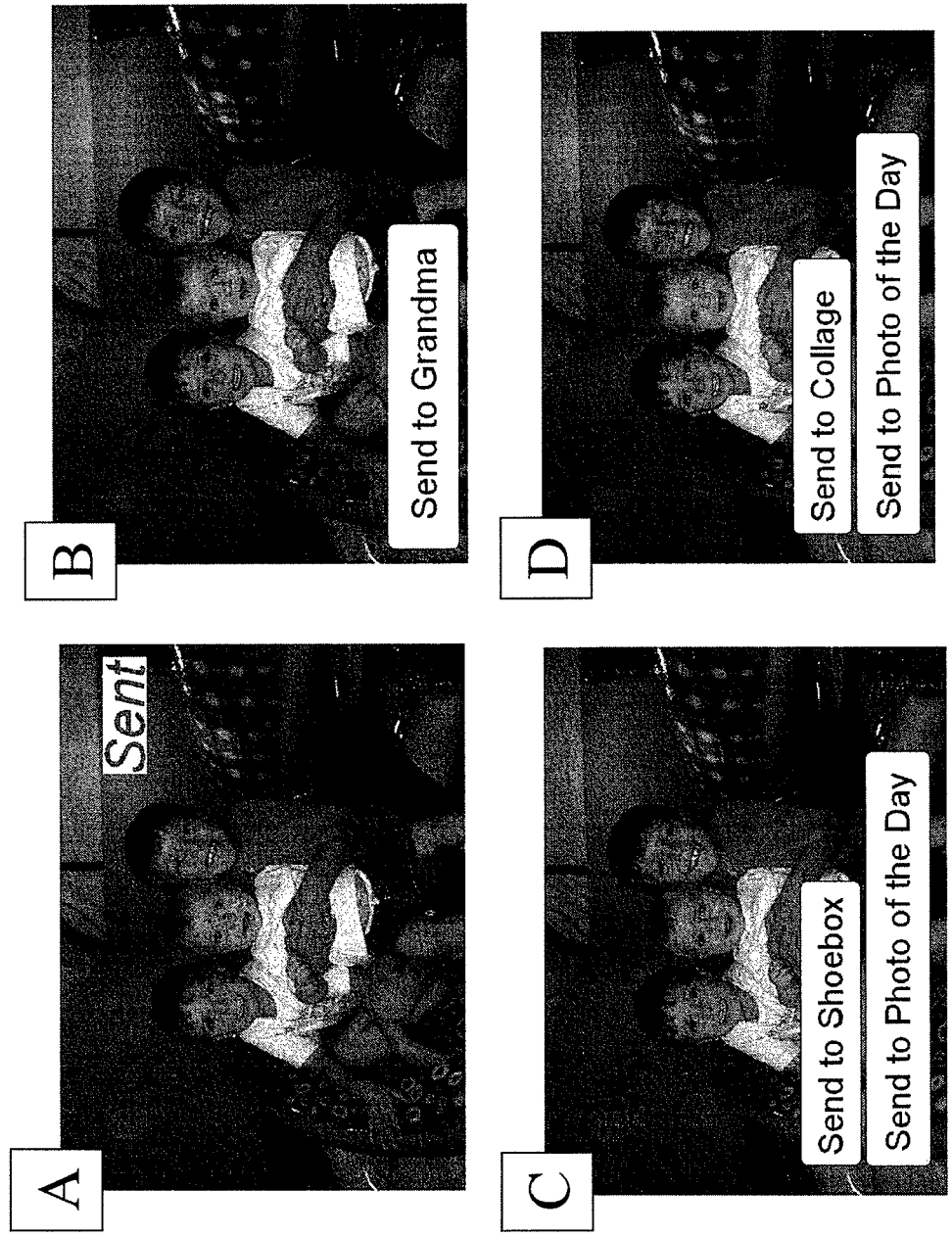
FIGS. 4A-D illustrate various other potential GrannySnap screens that may be presented to a camera phone operator after a photo is taken according to embodiments of the present invention.

FIGS. 4A-D illustrate various other potential GrannySnap screens that may be presented to a camera phone operator after a photo is taken according to embodiments of the present invention. In one embodiment, FIG. 4A represents an immediate delivery mode in which a digital picture is sent to a printing service after the picture is taken without prompting the user. The printing service then prints the picture as scheduled. For example, the picture may be automatically entered into a list of pictures for printing on an elder's digital mailbox as part of a periodic digital publication from a caregroup associated with the digital mailbox; thus, facilitating photo completion.

FIG. 4B represents a simple review mode in accordance with one embodiment of the present invention in which the user is offered an opportunity to confirm his/her desire to sent the photo to a predetermined destination, which may have been identified earlier by the user via a configuration screen of the GrannySnap application.

FIGS. 4C and 4D illustrate exemplary screen shots which allow the hand held device user to choose a publication switch delivery gateway/portal. Different portal options may have been configured earlier permitting the user to choose distinct options. For example, the user may have the option of sending the recently taken digital photo to an electronic shoebox (for later use at the family web site), putting the recently taken digital photo in a photo of the day carousel to be scheduled for printing over the next several days, and/or sending the recently taken digital photo to a special printing style or form a, such as a collage that has been customized by the user.

Figure 5:
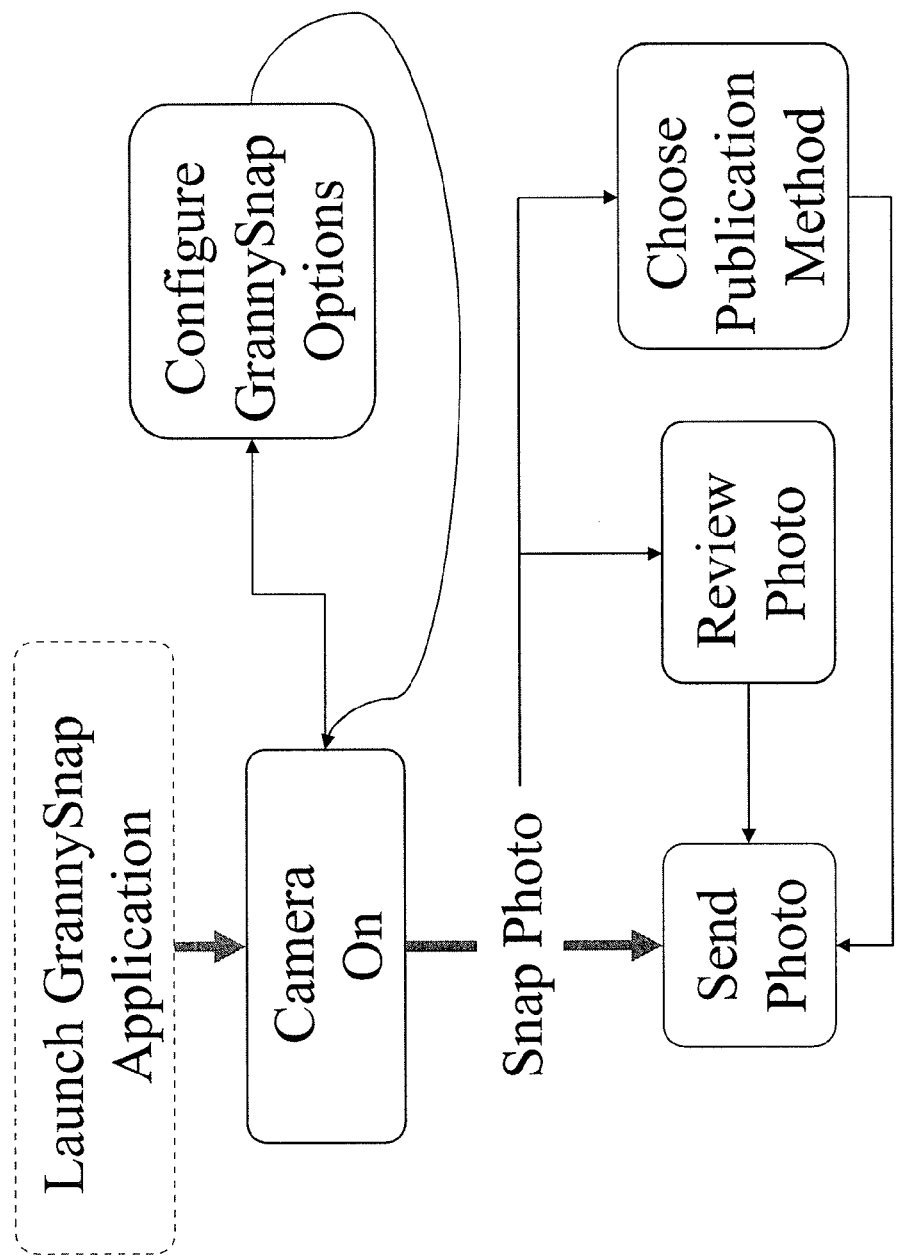
FIG. 5 illustrates a photo transmission process implemented by the GrannySnap application in accordance with one embodiment of the present invention.
Figure 6:
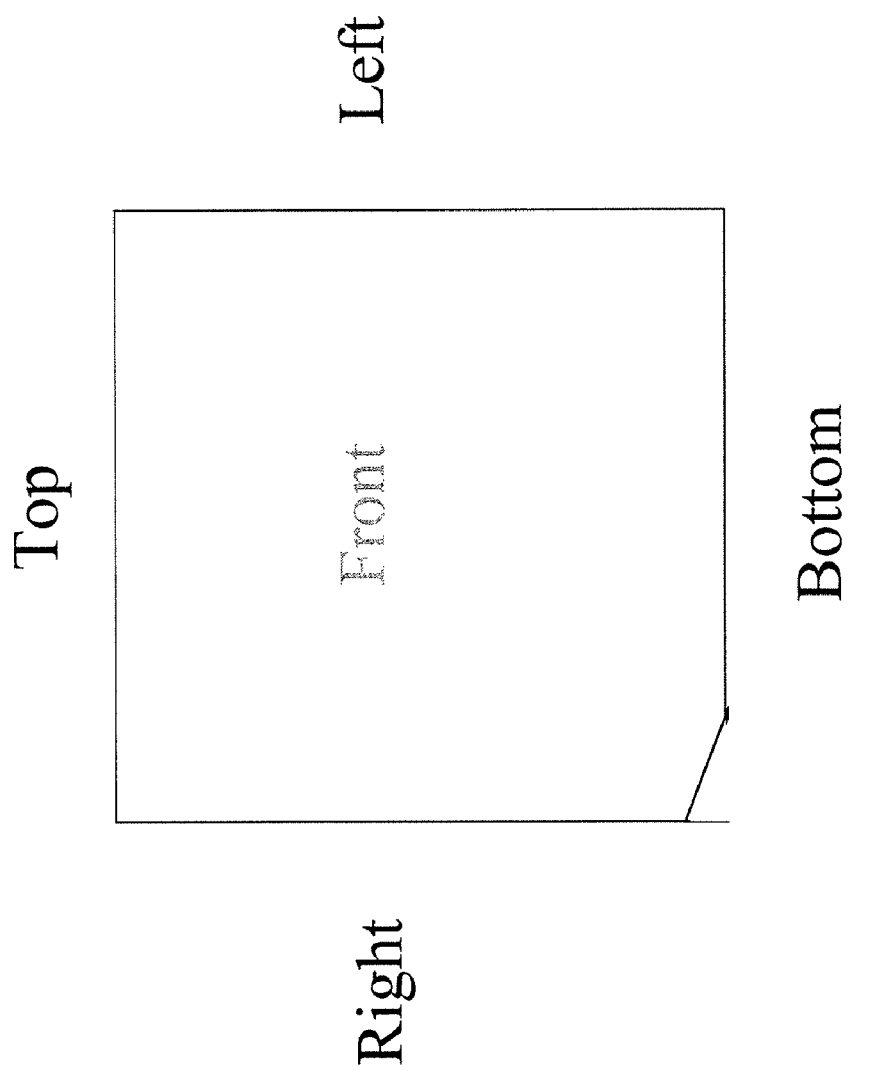
FIG. 6 illustrates a notched piece of paper in accordance with an embodiment of the present invention, which allows the matching of notches on a flatbed scanner, for example, with paper input tray(s) thereby forcing a specific top-bottom, left-right, front-back orientation.

FIG. 5 illustrates a photo transmission process implemented by the GrannySnap application in accordance with one embodiment of the present invention. According to the present example, heavy arrow lines identify a minimalist user actions corresponding to the photo delivery mode described with reference to FIG. 3. Alternatively, the user may set up various configuration options. In one embodiment, the options in the configuration state include one or more of the following:

Change e-Mail target (for gateway functions—e.g. collage, basic single photo, shoebox, . . . etc)
Change review mode (immediate—no review, pre-send review, pre-print review)
Info/help
Exit FIG. 6 illustrates a notched piece of paper in accordance with an embodiment of the present invention. In one embodiment, such notched paper allows the matching of notches on a flatbed scanner, for example, with paper input tray(s) thereby forcing a specific top-bottom, left-right, front-back orientation. According to the present example, the notch is placed at the bottom and to left to reduce interference with paper path rollers to minimize potential for paper jamming. Various other notch placements are possible. Advantageously, by matching notches on a flatbed scanner of the digital mailbox appliance, for example, with the paper input tray(s), a specific top-bottom, left-right, front-back orientation of the customized paper may be enforced. In the context of placement of premium photo papers, notched paper and corresponding paper trays are thought to decrease error rates and enhance the likelihood of correct orientation for a wide range of user skill levels.

Figure 7:
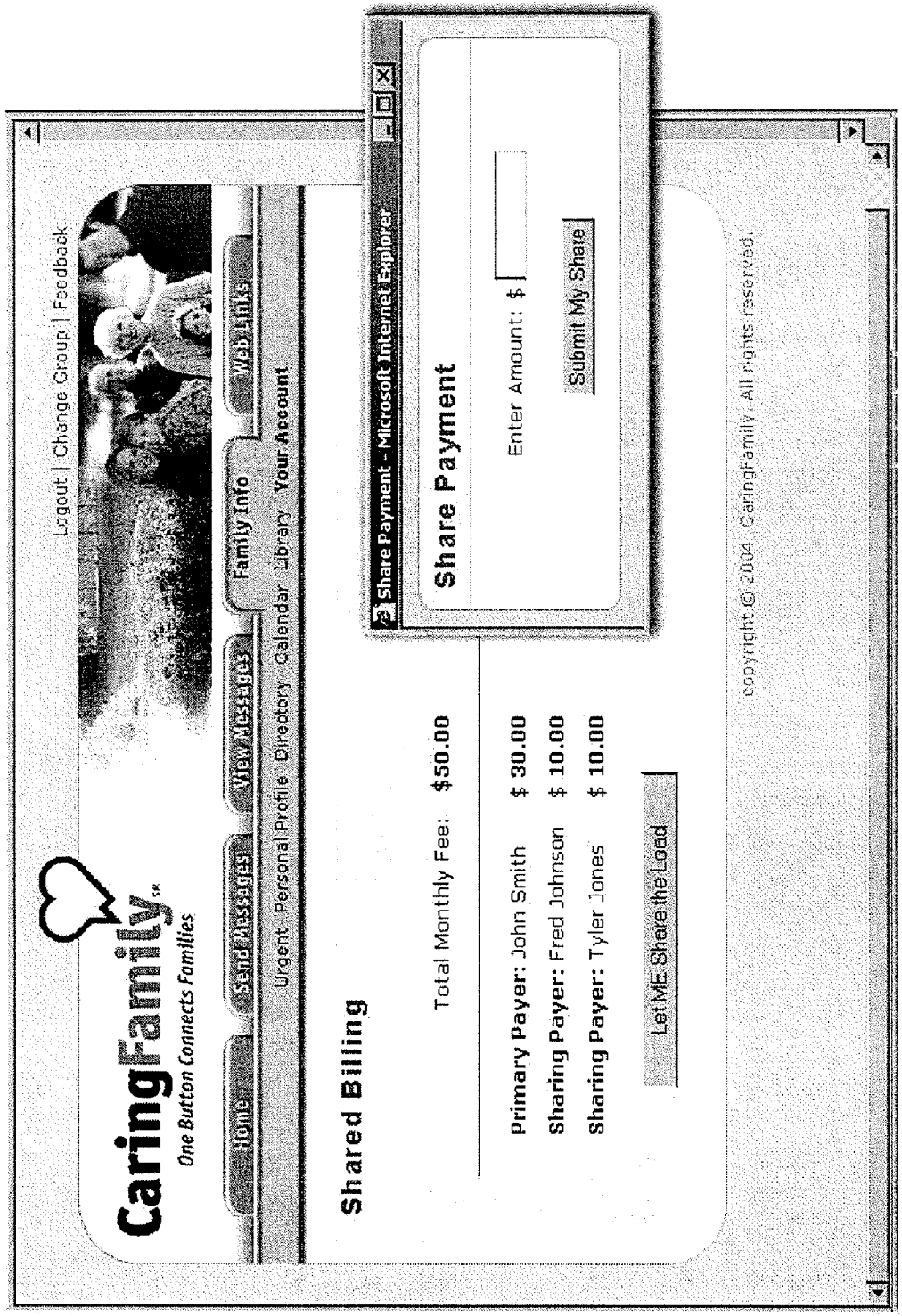
FIG. 7 illustrates a payment screen of the family private network service in accordance with an embodiment of the present invention.

FIG. 7 illustrates a payment screen of the family private network service in accordance with an embodiment of the present invention. According to the present example, a monthly bill for a communication service provider is displayed to members of a caregroup that may wish to share the load. A primary buyer (payer) and current sharing payers are displayed along with current payment responsibilities. In one embodiment, the logged-in member can initiate, remove, or modify their own payment commitment (amount or mechanism), but not that of others. Such commitment may be maintain going forward until changed by the member or until the service is deactivated. In one embodiment, the primary payer is legally responsible for the entire monthly service fee reduced by any amount paid by sharing payers. Consequently, in such an embodiment, the last man out rule applies to the primary buyer (payer). That is, if one or more sharing payers drop out, the primary buyer must cover the portion of the total monthly fee previously paid by the one or more former sharing payers. In one embodiment, if and when payment problems arise, the caregroup members serving as primary or sharing payers are personally notified by email and requested to revise their responsibility, e.g., delete commitment or revise credit card information. In one embodiment, service billing to primary and sharing payers may be staggered. For example, the primary payer may not be billed until X days after sharing payers.

Figure 8:
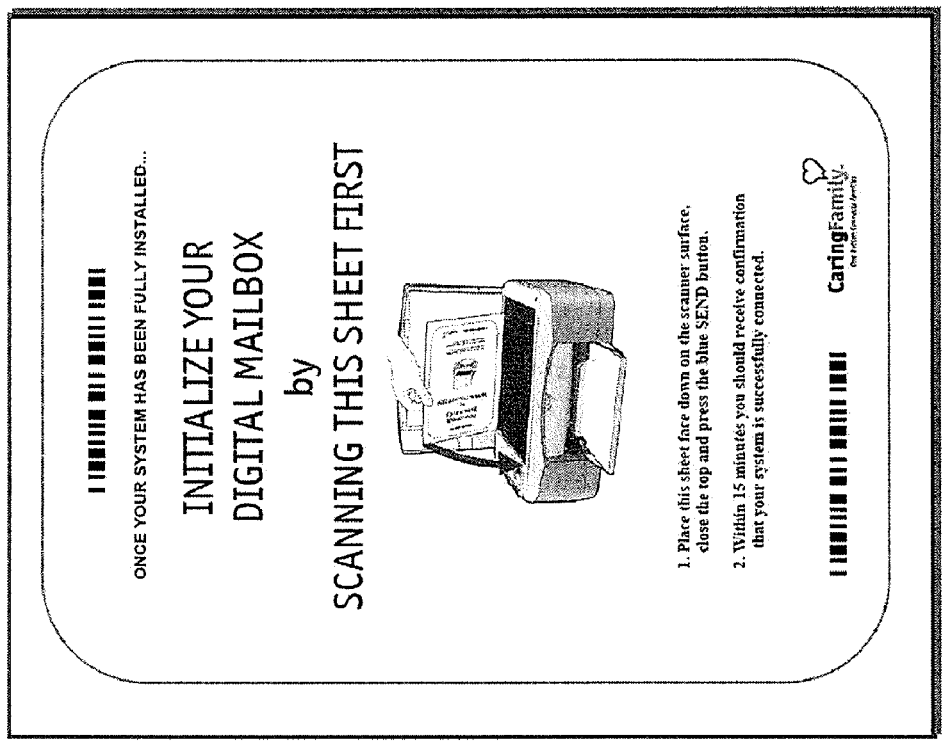
FIG. 8 illustrates an install scan page according to one embodiment of the present invention.

FIG. 8 illustrates an install scan page according to one embodiment of the present invention. According to this example, the install scan page includes a "command" barcode. In one embodiment, the command barcode serves to align the digital mailbox appliance with appropriate databases and services associated with the corresponding caregroup. The install scan page when scanned by the digital mailbox appliance may also initiate testing of the communication loop end-to-end to the family private network service and back.

The scanning of the install scan page by the digital mailbox may also trigger the family private network service to send initial startup deliveries to the digital mailbox appliance, such as a welcome packet, directions for use, customer service contact information and the like. Advantageously, use of such an installation mechanism provides the installer with immediate feedback.

The install scan page may also be used to reconfigure the digital mailbox appliance when (i) swapping a digital mailbox appliance owner in an institutional setting (e.g. hospital, hospice, convalescent hospital), (ii) the digital mailbox appliance is moved to a new location, or (iii) when information associated with the phone line changes, such as phone number change, addition of calling features, e.g., caller id, call waiting, etc.

Figure 9:
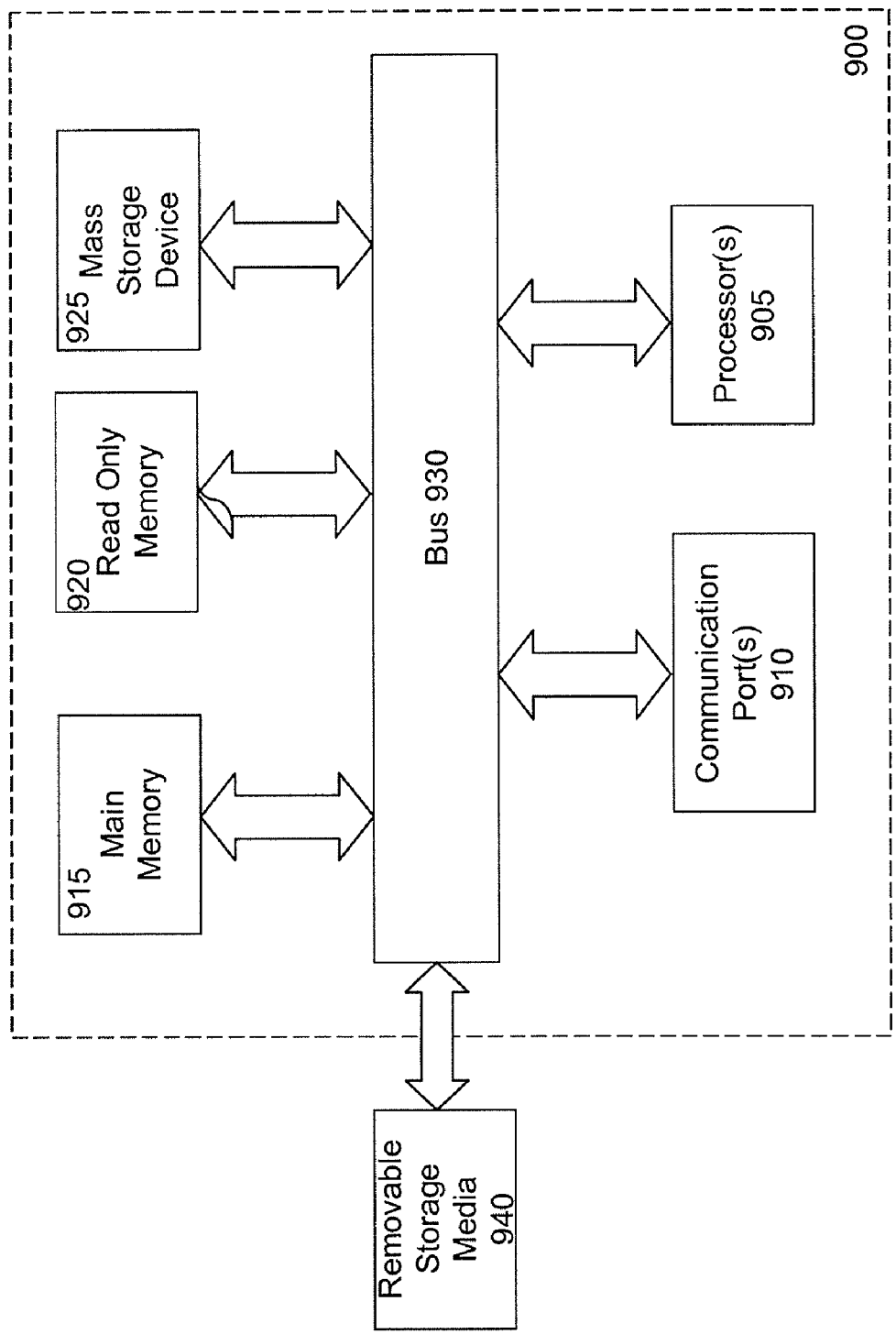
FIG. 9 illustrates a computer system suitable for use, in accordance with an embodiment of the present invention.

FIG. 9 illustrates a computer system 900 suitable for use, in accordance with an embodiment of the present invention. The computer system 900 may represent exemplary hardware included within a camera, camera phone or home computer used in connection with the family private network. According to FIG. 9, the computer system includes at least one processor 905, at least one communication port 910, a main memory 915, a read only memory 920, a mass storage 925, a bus 930, and a removable storage media 940.

Exemplary processor(s) 905 can be an Intel® Itanium® or Itanium 2® processor(s) or AMD® Opteron® or Athlon MP® processor(s). Communication port(s) 910 can be any of an RS-232 port for use with a modem based dialup connection, a 10/100 Ethernet port, or a Gigabit port using copper or fiber. Communication port(s) 910 may be chosen depending on a network such a Local Area Network (LAN), Wide Area Network (WAN), or any network to which the computer system 900 connects.

Main memory 915 can be Random Access Memory (RAM), or any other dynamic storage device(s) commonly known in the art.

Read only memory 920 can be any static storage device(s) such as Programmable Read Only Memory (PROM) chips for storing static information such as instructions for processor 905.

Mass storage 925 can be used to store information and instructions. For example, hard disks such as the Adaptec® family of SCSI drives, an optical disc, an array of disks such as RAID, such as the Adaptec family of RAID drives, or any other mass storage devices may be used.

Bus 930 communicatively couples processor(s) 905 with the other memory, storage and communication blocks. Bus 930 can be a PCI/PCI-X or SCSI based system bus depending on the storage devices used.

Removable storage media 940 can be any kind of memory card, flash memory stick, external hard-drives, floppy drives, IOMEGA® Zip Drives, Compact Disc-Read Only Memory (CD-ROM), Compact Disc—Re-Writable (CD-RW), Digital Video Disk—Read Only Memory (DVD-ROM). It is to be noted that the aforementioned examples do not limit the scope of the invention and are only exemplary embodiments.

What is claimed is:

1. A method of facilitating photo completion comprising:
a hand-held device, configured to both capture and transmit digital photos, running a local application that controls pre-transmission review of digital photos captured by the hand-held device, a delivery target to which the digital photos are to be delivered and a hard copy presentation method when the delivery target corresponds to a remote hard copy device;
the local application presenting one or more configuration screens on a display of the hand-held device; and
via the one or more configuration screens, the local application receiving default parameter settings from a user of the hand-held device for a pre-transmission review mode, the delivery target and the hard copy presentation method, when the local application is running on the hand-held device, delivery of subsequently captured digital photos is streamlined by applying the default parameter settings to the subsequently captured digital photos, the default parameter settings for the pre-transmission review mode including one or more of (i) a confirmation mode, which, responsive to capture of a digital photo, seeks confirmation from the user regarding the delivery target prior to transmission of the captured digital photo from the hand-held device to the delivery target and (ii) an acknowledgement mode, which, responsive to capture of the digital photo and without seeking confirmation from the user, transmits the captured digital photo from the hand-held device to the delivery target and informs the user regarding status of the transmission.

2. The method of claim 1, wherein the hand-held device comprises a mobile phone.

3. The method of claim 1, wherein the hand-held device comprises a digital camera with wireless transmission capabilities.

4. The method of claim 1, wherein the delivery target corresponds to a digital mailbox appliance.

5. The method of claim 1, further comprising after transmission of the captured digital photo from the hand-held device to the delivery target, the local application immediately readies the hand-held device for another digital photo capture and transmission event.

6. The method of claim 1, further comprising, responsive to a request by the user, the local application allowing the user to reconfigure the default parameter settings by representing the one or more configuration screens on the display of the hand-held device.

7. A hand-held device configured to both capture and transmit digital photos, the hand-held device comprising:
 a display;
 a storage device having stored therein a local application configured to control pre-transmission review of digital photos captured by the hand-held device, a delivery target to which the digital photos are to be delivered and a hard copy presentation method when the delivery target corresponds to a remote hard copy device; and
 one or more processors coupled to the storage device configured to execute the local application to (i) present one or more configuration screens on the display, (ii) receive default parameter settings from a user of the hand-held device and (iii) streamline delivery of subsequently captured digital photos to the delivery target by applying the default parameter settings to the subsequently captured digital photos, where:
 the one or more configuration screens prompt the user for the default parameter settings, which include (i) information regarding the delivery target to which the subsequently captured digital photos are to be delivered, (ii) information regarding the hard copy presentation method and (iii) information regarding a pre-transmission review mode selected from (a) a confirmation mode, which, responsive to capture of a digital photo, seeks confirmation from the user regarding the delivery target prior to transmission of the captured digital photo from the hand-held device to the delivery target and (b) an acknowledgement mode, which, responsive to capture of the digital photo and without seeking confirmation from the user, automatically transmits the captured digital photo from the hand-held device to the delivery target and informs the user regarding status of the transmission.

8. The hand-held device of claim 7, wherein the hand-held device comprises a mobile phone.

9. The hand-held device of claim 7, wherein the hand-held device comprises a digital camera with wireless transmission capabilities.

10. The hand-held device of claim 7, wherein the delivery target corresponds to a digital mailbox appliance.

11. The hand-held device of claim 7, wherein after transmission of the captured digital photo from the hand-held device to the delivery target, the local application immediately readies the hand-held device for another digital photo capture and transmission event.

12. The hand-held device of claim 7, wherein responsive to a request by the user, the local application allows the user to reconfigure the default parameter settings by representing the one or more configuration screens on the display of the hand-held device.

13. A program storage device readable by one or more processors of a hand-held device, which is configured to both capture and transmit digital photos, the program storage device tangibly embodying a program of instructions executable by the one or more processors to perform method steps for facilitating photo completion, said method steps comprising:
 presenting one or more configuration screens on a display of the hand-held device;
 via the one or more configuration screens, receiving default parameter settings from a user of the hand-held device for a pre-transmission review mode, a delivery target and a hard copy presentation method when the delivery target corresponds to a remote hard copy device; and
 streamlining delivery of subsequently captured digital photos to the delivery target by applying the default parameter settings to the subsequently captured digital photos, the default parameter settings for the pre-transmission review mode including one or more of (i) a confirmation mode, which, responsive to capture of a digital photo, seeks confirmation from the user regarding the delivery target prior to transmission of the captured digital photo from the hand-held device to the delivery target and (ii) an acknowledgement mode, which, responsive to capture of the digital photo and without seeking confirmation from the user, automatically transmits the captured digital photo from the hand-held device to the delivery target and informs the user regarding status of the transmission.

14. The program storage device of claim 13, wherein the hand-held device comprises a mobile phone.

15. The program storage device of claim 13, wherein the hand-held device comprises a digital camera with wireless transmission capabilities.

16. The program storage device of claim 13, wherein the delivery target corresponds to a digital mailbox appliance.

17. The program storage device of claim 13, wherein said method steps further comprise after transmission of the captured digital photo from the hand-held device to the delivery target, immediately reading the hand-held device for another digital photo capture and transmission event.

18. The program storage device of claim 13, wherein said method steps further comprise, responsive to a request by the user, allowing the user to reconfigure the default parameter settings by representing the one or more configuration screens on the display of the hand-held device.

* * * * *